(12) United States Patent
Klein (10) Patent No.: US 10,785,301 B2
(45) Date of Patent: Sep. 22, 2020

(54) NVM EXPRESS OVER FABRICS

(71) Applicant: Toshiba Memory Corporation, Tokyo (JP)

(72) Inventor: Yaron Klein, Raanana (IL)

(73) Assignee: Toshiba Memory Corporation, Tokyo (JP)

( * ) Notice: Subject to any disclaimer, the term of this patent is extended or adjusted under 35 U.S.C. 154(b) by 282 days.

(21) Appl. No.: 15/668,314

(22) Filed: Aug. 3, 2017

(65) Prior Publication Data

US 2019/0045009 A1 Feb. 7, 2019

(51) Int. Cl.
*H04L 29/08* (2006.01)
*G06F 15/173* (2006.01)
*H04L 12/931* (2013.01)

(52) U.S. Cl.
CPC .... *H04L 67/1097* (2013.01); *G06F 15/17331* (2013.01); *H04L 49/356* (2013.01)

(58) Field of Classification Search
CPC ............... H04L 67/1097; H04L 49/356; G06F 15/17331; G11C 14/00; G11C 15/046; G11C 29/765
See application file for complete search history.

(56) References Cited

U.S. PATENT DOCUMENTS

| | | | |
|---|---|---|---|
| 7,197,662 B2 * | 3/2007 | Bullen | H04L 41/0663 714/42 |
| 7,389,393 B1 | 6/2008 | Karr et al. | |
| 8,775,718 B2 * | 7/2014 | Kanevsky | G06F 3/061 370/389 |

(Continued)

FOREIGN PATENT DOCUMENTS

| | | |
|---|---|---|
| EP | 2109822 A1 | 10/2009 |
| WO | 2014031387 A1 | 2/2014 |

OTHER PUBLICATIONS

International Search Report and Written Opinion corresponding to PCT/IB2018/000991 dated Jan. 10, 2019.

*Primary Examiner* — Michael Won
(74) *Attorney, Agent, or Firm* — White & Case LLP (57) ABSTRACT

A network storage appliance comprises solid state disks, a network interface adapter communicatively coupled to the solid state disks and a host client, a non-volatile semiconductor memory device communicatively coupled to the solid state disks and the network interface adapter, and a CPU communicatively coupled to the non-volatile semiconductor memory device and the network interface adapter. The non-volatile semiconductor memory device can receive data from the host client via the network interface adapter, store the data temporarily, and transfer the data to one of the solid state disks. The CPU can receive a write request from the host client via the network interface adapter, determine whether or not the non-volatile semiconductor memory device is available to store the data, initiate the network interface adapter to perform the transfer of the data from the host client to the non-volatile semiconductor memory device if the non-volatile semiconductor memory device is available to store the data, and initiate the network interface adapter to broadcast a query to one or more external storages if the non-volatile semiconductor memory device is not available to store the data.

38 Claims, 7 Drawing Sheets

(56) References Cited

U.S. PATENT DOCUMENTS

| | | |
|---|---|---|
| 8,819,304 B2 | 8/2014 | Shapiro et al. |
| 8,898,388 B1 | 11/2014 | Kimmel |
| 9,170,958 B2 | 10/2015 | Blount et al. |
| 9,237,195 B2* | 1/2016 | CaraDonna ......... H04L 67/1097 |
| 2002/0083299 A1* | 6/2002 | Van Huben ....... G06F 15/17381 712/29 |
| 2004/0088393 A1* | 5/2004 | Bullen ................ H04L 41/0663 709/223 |
| 2008/0126357 A1* | 5/2008 | Casanova ........... G06F 16/1844 |
| 2008/0140932 A1* | 6/2008 | Flynn ................... G06F 3/0643 711/114 |
| 2008/0256183 A1* | 10/2008 | Flynn ................... G06F 3/0688 709/204 |
| 2011/0022801 A1* | 1/2011 | Flynn ....................... G06F 9/52 711/120 |
| 2013/0073821 A1* | 3/2013 | Flynn ..................... G06F 3/061 711/162 |
| 2013/0170274 A1* | 7/2013 | Yu ....................... G11C 11/4063 365/51 |
| 2015/0026411 A1* | 1/2015 | Lippert ............... G06F 12/0833 711/135 |
| 2015/0281356 A1* | 10/2015 | Maturana ........... H04L 67/1097 709/217 |
| 2016/0006807 A1* | 1/2016 | Bangole .................. G06F 16/00 709/219 |
| 2016/0210050 A1* | 7/2016 | Hyun ..................... G06F 3/0611 |
| 2016/0217104 A1 | 7/2016 | Kamble et al. |
| 2016/0308968 A1* | 10/2016 | Friedman ............ H04L 67/2842 |
| 2016/0344834 A1* | 11/2016 | Das ..................... H04L 67/2842 |
| 2017/0177222 A1* | 6/2017 | Singh ....................... G06F 3/061 |
| 2017/0180478 A1* | 6/2017 | Hashimoto ......... H04L 67/1097 |
| 2018/0059944 A1* | 3/2018 | Helmick ............... G06F 3/0604 |
| 2018/0059945 A1* | 3/2018 | Helmick ............... G06F 3/0656 |
| 2018/0059976 A1* | 3/2018 | Helmick ............... G06F 3/0688 |
| 2018/0107417 A1* | 4/2018 | Shechter ............... G06F 3/0625 |
| 2018/0341429 A1* | 11/2018 | Bolkhovitin .......... G06F 3/0659 |
| 2019/0045009 A1* | 2/2019 | Klein ................ G06F 15/17331 |

* cited by examiner

NVM EXPRESS OVER FABRICS

FIELD OF THE INVENTION

The present disclosure relates to non-volatile memory express storage appliances and methods for implementing non-volatile random-access memory in high performance storage networks.

BACKGROUND

Low latency for write commands is an important feature in High Performance Computing (HPC) and especially in storage networks. An example of its importance is the growing area of in-memory databases (IMDBs). The increase in computing resources, such as CPUs and memory, enables loading the entire database into memory and process it by the CPU. This enables the fast in-memory processing of large data sets. However, incoming transactions must be persistent, and thus must be written to persistent media. As processing stalls until acknowledgement of such transactions, it becomes a bottleneck to the entire process.

The introduction of NVMe™ ("nonvolatile memory express") devices with fast PCIe (Peripheral Component Interface Express) interfaces and efficient storage stacks have reduced the access time to the persistent media. In addition, remote direct memory access (RDMA) network interface controllers (NIC) have evolved to provide very fast (single digit μsec) data transfer. The introduction of the NVMe™ over Fabric standard enables an environment, where host clients can access NVMe™ disks via low latency network fabrics. Each host client and storage appliance has an RDMA NIC that enables low latency transfer between each element in the fabric. However, there remains a long felt need to efficiently manage and implement NVMe™ devices in high performance storage networks.

SUMMARY OF INVENTION

The present disclosure relates to a network storage appliance comprising solid state disks, a network interface adapter communicatively coupled to the solid state disks and a host client, a non-volatile semiconductor memory device communicatively coupled to the solid state disks and the network interface adapter, and a CPU communicatively coupled to the non-volatile semiconductor memory device and the network interface adapter. The network interface adapter can retrieve data from the host client and transfer the data from the host client to the solid state disks. The non-volatile semiconductor memory device can receive data from the host client via the network interface adapter, store the data temporarily, and transfer the data to one of the solid state disks. The CPU can receive a write request from the host client via the network interface adapter and determine whether or not the non-volatile semiconductor memory device is available to store the data. In the case of determining that the non-volatile semiconductor memory device is available to store the data, the CPU can initiate the network interface adapter to perform the transfer of the data from the host client to the non-volatile semiconductor memory device via the network interface adapter. In the case of determining that the non-volatile semiconductor memory device is not available to store the data, the CPU can initiate the network interface adapter to broadcast a query to one or more external storages via the network interface adapter. Further, the CPU can send an acknowledgement status to the host client via the network interface adapter that indicates that the data has been stored in the non-volatile semiconductor memory device.

According to one implementation, the non-volatile semiconductor memory device may comprise one of resistive random-access memory, magneto resistive random-access memory, nano random-access memory, and battery-backed dynamic random-access memory.

In some implementations, the network storage appliance may include a volatile memory device communicatively coupled to the solid state disks and the network interface adapter. The volatile memory device may receive data from the one or more external storages via the network interface adapter in the case of determining that the non-volatile semiconductor memory device is not available to store the data. The one or more external storages may correspond to one or more second network storage appliance. The volatile memory device may comprise dynamic random-access memory (DRAM).

In other implementations, the volatile semiconductor memory device may store the data temporarily and transfer the data to one of the solid state disks.

In certain implementations, the CPU may receive a response to the query from a first external storage of the one or more external storages via the network interface adapter. The response to the query may indicate that the first external storage is available to store the data. The CPU may send a second write request to the first external storage via the network interface adapter. The one or more external storages may be one or more of many network storage appliances in a storage network.

According to one implementation, the second write request may initiate the first external storage to begin the transfer of the data from the host client to the first external storage.

In some implementations, the CPU may receive a signal from the one or more external storages via the network interface adapter. The signal may indicate that the data has been stored in the one or more external storages.

In other implementations, the CPU may send a second acknowledgment status to the host client via the network interface adapter. The second acknowledgment status may indicate that the data has been stored in the one or more external storages.

According to some implementations, the network interface adapter functions according to a remote direct memory access (RDMA) protocol. The network interface adapter may be connected to a network communication fabric. According to one implementation, the network interface adapter accesses the non-volatile semiconductor memory device independently of the CPU.

In some implementations, the non-volatile semiconductor memory device may comprise a reserved storage area for the host client. The non-volatile semiconductor memory device may further comprise a local storage area and a remote storage area.

In certain implementations, the non-volatile semiconductor memory device may determine whether the reserved storage area is available to store the data. In response to determining that the reserved storage area is available to store the data, the non-volatile semiconductor memory device may allocate space from the reserved storage area in which to store data.

In other implementations, the non-volatile semiconductor memory device may, in response to determining that the reserved storage area is not available to store the data, determine whether the local storage area is available to store the data. In response to determining that the local storage area is available to store the data, the non-volatile semiconductor memory device may allocate space from the local storage area in which to store the data.

According to one implementation, the non-volatile semiconductor memory device may determine whether the remote storage area is available to store the data. In response to determining that the remote storage area is available to store the data, the non-volatile semiconductor memory device may allocate space from the remote storage area in which to store the data.

In some implementations, the data is transferred from the host client to the non-volatile semiconductor memory device of the target network storage appliance within a time period greater than 0.1 μsec and less than 1 μsec.

A second aspect of the present disclosure relates to a method of transferring data from a host client to a network storage appliance. The method comprises sending, from a host client, a first write request to a target network storage appliance via a network interface adapter. The method also comprises sending, from the target network storage appliance, a second write request to a second network storage appliance via the network interface adapter. The method further comprises transferring, from the host client, data to a non-volatile semiconductor memory device of the second network storage appliance via the network interface adapter that is associated with the first write request. Further, the method comprises sending, from the second network storage appliance via the network interface adapter, a signal to the target network storage appliance that indicates that the data has been stored in the non-volatile semiconductor memory device of the second network storage appliance. The method also comprises sending, from the target network storage appliance via the network interface adapter, an acknowledgement status to the host client that indicates that the data has been stored. Further, the method comprises transferring, from the non-volatile semiconductor memory device of the second network storage appliance via the network interface adapter, the data to a volatile semiconductor memory device of the target network storage appliance. The method further comprises transferring, from the volatile semiconductor memory device of the target network storage appliance, the data to a solid state disk of the target network storage appliance.

According to some implementations, the non-volatile semiconductor memory device may comprise one of resistive random-access memory, magneto resistive random-access memory, nano random-access memory, and battery-backed dynamic random-access memory.

In some implementations, The volatile memory device may comprise dynamic random-access memory (DRAM).

In other implementations, the network interface adapter functions according to a remote direct memory access (RDMA) protocol. The network interface adapter may be connected to a network communication fabric. According to one implementation, the network interface adapter accesses the non-volatile semiconductor memory device independently of the CPU.

According to some implementations, the non-volatile semiconductor memory device may comprise a reserved storage area for the host client. The non-volatile semiconductor memory device may further comprise a local storage area and a remote storage area.

In certain implementations, the method further comprises determining whether the reserved storage area is available to store the data and, in response to determining that the reserved area is available to store the data, allocating space from the reserved storage area in which to store the data.

In other implementations, the method comprises, in response to determining that the reserved storage area is not available to store the data, determining whether the local storage area is available to store the data and, in response to determining that the local storage area is available to store the data, allocating space from the local storage area in which to store the data.

According to some implementations, the method further comprises determining whether the remote storage area is available to store the data and, in response to determining that the remote storage area is available to store the data, allocating space from the remote storage area in which to store the data.

In certain implementations, the method further comprises transferring the data from the host client to the non-volatile semiconductor memory device of the target network storage appliance within a time period greater than 0.1 μsec and less than 1 μsec.

In certain implementations, the second network storage appliance may be one of many network storage appliances in a storage network.

BRIEF DESCRIPTION OF THE DRAWINGS

The foregoing and other objects and advantages will be apparent upon consideration of the following detailed description, taken in conjunction with the accompanying drawings, in which like reference characters refer to like parts throughout, and in which.

DETAILED DESCRIPTION

Figure 1:
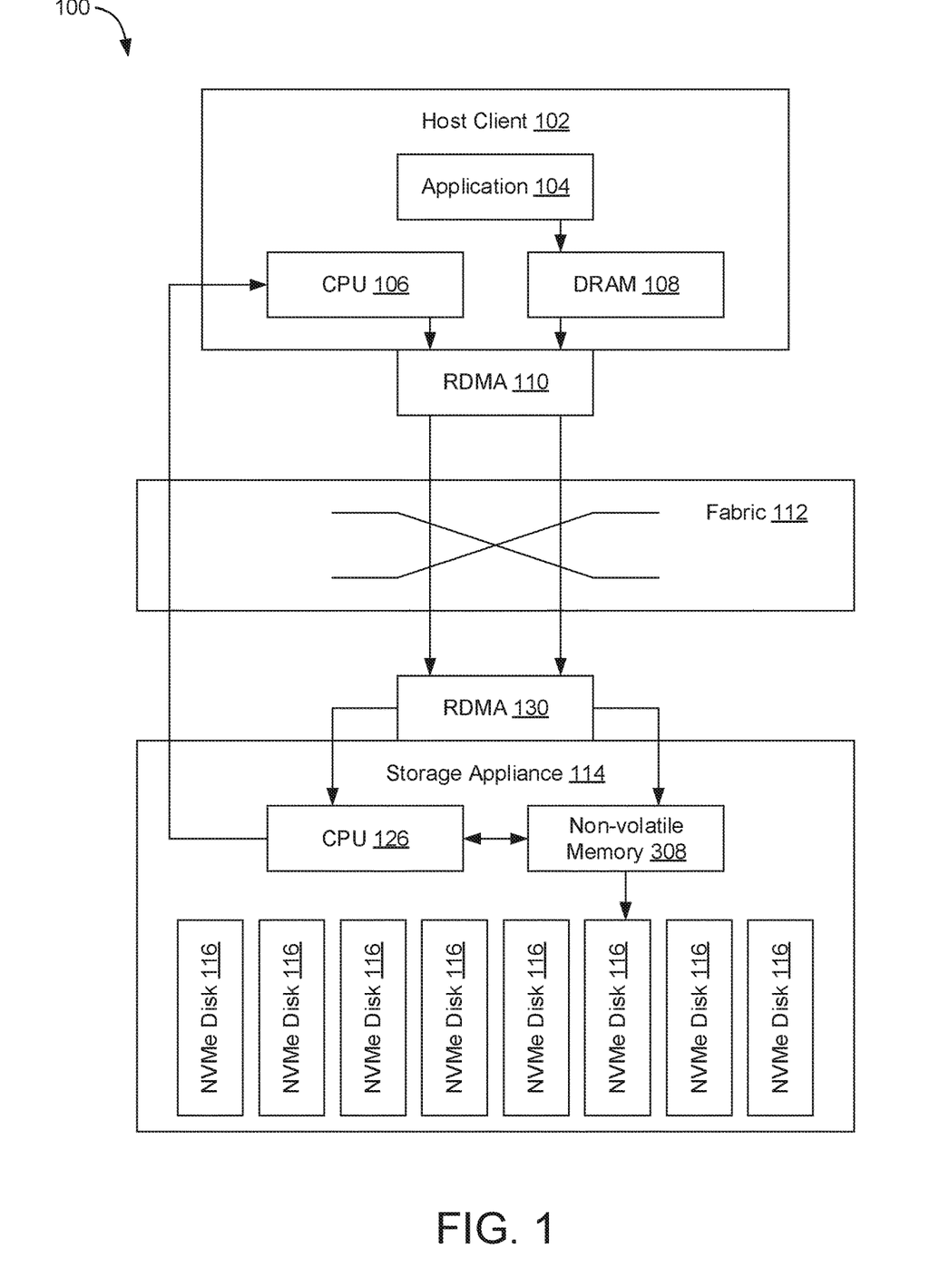
FIG. 1 shows a schematic representation of an NVMe™ storage appliance with non-volatile memory, configured according to one or more embodiments of the present disclosure.

FIG. 1 shows a schematic representation of an NVMe™ system 100 comprising a host client 102 and storage appliance 114 communicating over Fabric 112. The host client 102 is a computing system that comprises an application 104, a CPU ("central processing unit") 106, and DRAM ("dynamic random access memory") 108. The storage appliance 114 is a computing system that comprises a CPU 126, non-volatile memory 308, and multiple NVMe™ disks 116. The host client 102 and storage appliance 114 interface using RDMA network adapters 110 and 130 which are a type of NIC. DRAM 108 maintains data only for as long as power is applied. Fabric 112 is a network topology in which nodes pass data to each other through interconnecting switches and network connections such as electrical cables, optical fibers, or wireless links.

Non-volatile memory 308 is random access memory that retains its information when power is turned off. Non-volatile memory 308 may be battery-backed DRAM or one of many emerging technologies. Battery-backed DRAM is similar to DRAM 108 but supported by a battery such that the DRAM does not lose power and retains the data. An example of an emerging non-volatile memory technology is resistive random-access memory (RRAM or ReRAM) that works by changing the resistance across a dielectric solid-material. Another example of an emerging non-volatile memory technology is magneto resistive random-access memory (MRAM) which uses magnetic elements. In addition, there are future technologies such as Nano-RAM which is based on carbon nanotube technology. Non-volatile memory 308 may reside in NVMe™ disks 116.

When the host client 102 wants to write data to a particular NVMe™ disk 116 in the storage appliance 114, CPU 106 of the host client encapsulates the write command and sends the write command to CPU 126 of the storage appliance 114 using the RDMA interface 110. Application 104 sends the data to DRAM 108 of the host client so that the data is ready for transmission to the storage appliance 114 once the storage appliance 114 is ready to receive it.

Once the storage appliance 114 receives the write command using the RDMA interface 130, the CPU 126 of the storage appliance 114 parses the encapsulated write command, de-capsulates it, and extracts the data information. CPU 126 of the storage appliance 114 then initiates a transaction of the data using the RDMA interface 130 from DRAM 108 of the host client 102 to the non-volatile memory 308 of the storage appliance 114. Following the RDMA 130 transaction, the data will reside in the non-volatile memory 308 of the storage appliance 114.

Once the data resides in the non-volatile memory 308 of the storage appliance 114, non-volatile memory 308 sends CPU 126 of the storage appliance 114 a status that indicates that the data has been stored in non-volatile memory 308. The CPU 126 of the storage appliance 114 then encapsulates the status and sends it to the CPU 106 of the host client 102 using the RDMA interface 130. The status serves as an acknowledgement that the data has been stored in the specified NVMe™ disk 116.

Since the storage appliance 114 has sent the acknowledgement to the host client 102, in a background process, CPU 126 of the storage appliance 114 initiates the transfer of the data from the non-volatile memory 308 of the storage appliance 114 to the NVMe™ disk 116 specified by the write command.

Figure 2:
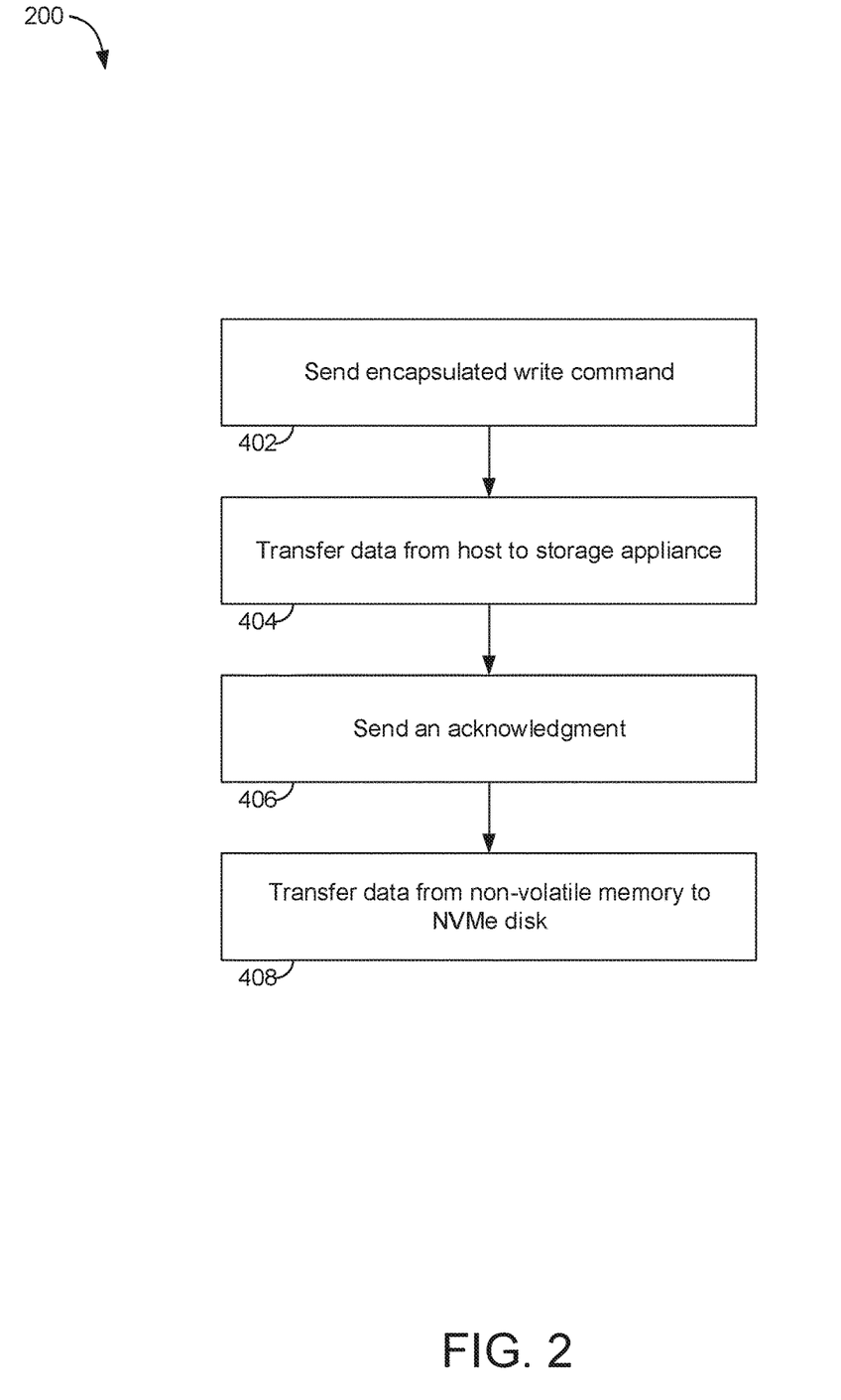
FIG. 2 is a flow diagram of method steps for a write command in NVMe™ over Fabric with non-volatile memory, according to an embodiment of the present disclosure.

A process 200 of a write command using NVMe™ system 100 is illustrated in FIG. 2. The process 200 begins by sending an encapsulated write command in step 402. For example, in NVMe™ system 100, when the host client 102 wants to write data to a particular NVMe™ disk 116 in the storage appliance 114, CPU 106 of the host client encapsulates the write command and sends the write command to CPU 126 of the storage appliance 114 using the RDMA interface 110. Application 104 sends the data to DRAM 108 of the host client so that the data is ready for transmission to the storage appliance 114 once the storage appliance 114 is ready to receive it.

Process 200 continues by transferring data from the host client 102 to the storage appliance 114 in step 404. For example, in NVMe™ system 100, once the storage appliance 114 receives the write command using the RDMA interface 130, the CPU 126 of the storage appliance 114 parses the encapsulated write command, de-capsulates it, and extracts the data information. CPU 126 of the storage appliance then initiates a transaction of the data using the RDMA interface 130 from DRAM 108 of the host client 102 to the non-volatile memory 308 of the storage appliance 114. Following the RDMA 130 transaction, the data will reside in the non-volatile memory 308 of the storage appliance 114.

Process 200 continues by sending an acknowledgement to the host client 102 from the CPU 126 of storage appliance 114 in step 406. For example, in NVMe™ system 100, once the data resides in the non-volatile memory 308 of the storage appliance 114, non-volatile memory 308 sends CPU 126 of the storage appliance 114 a status that indicates that the data has been stored in non-volatile memory 308. The CPU 126 of the storage appliance 114 then encapsulates the status and sends it to the CPU 106 of the host client 102 using the RDMA interface 130. The status serves as an acknowledgement that the data has been stored in the specified NVMe™ disk 116.

Process 200 finishes by transferring the data from non-volatile memory 308 to one of the NVMe™ disks 116 in step 408. For example, in NVMe™ system 100, since the storage appliance 114 has sent the acknowledgement to the host client 102, in a background process, CPU 126 of the storage appliance 114 initiates the transfer of the data from the non-volatile memory 308 of the storage appliance 114 to the NVMe™ disk 116 specified by the write command.

In prior art systems, the storage appliance 114 relies on DRAM to store the data transferred from the host client 102 before transferring the data to the NVMe™ disk 116. Since DRAM maintains data only for as long as power is applied, prior art systems must wait until the data has been transferred to the NVMe™ disk 116 before sending the acknowledgement to the host client 102 that the data has been stored. Since RDMA interfaces 110 and 130 have high bandwidth and low latency, the main time consumption in prior art systems is in the disk access.

Process 200 allows for the latency to be just the transfer latency between the host client 102 and the storage appliance 114. The transfer of data from the non-volatile memory 308 to the NVMe™ disk 116 does not affect the latency of process 200. However, even in a storage appliance 114 implementation of battery-backed DRAM, the non-volatile memory 308 is relatively small compared to the NVMe™ disk 116. As such, it may be required to use another storage appliance 114 to store the incoming data while the storage appliance 114 that was intended to receive the data transfers the data from the non-volatile memory 308 to the NVMe™ disk 116.

Figure 3:
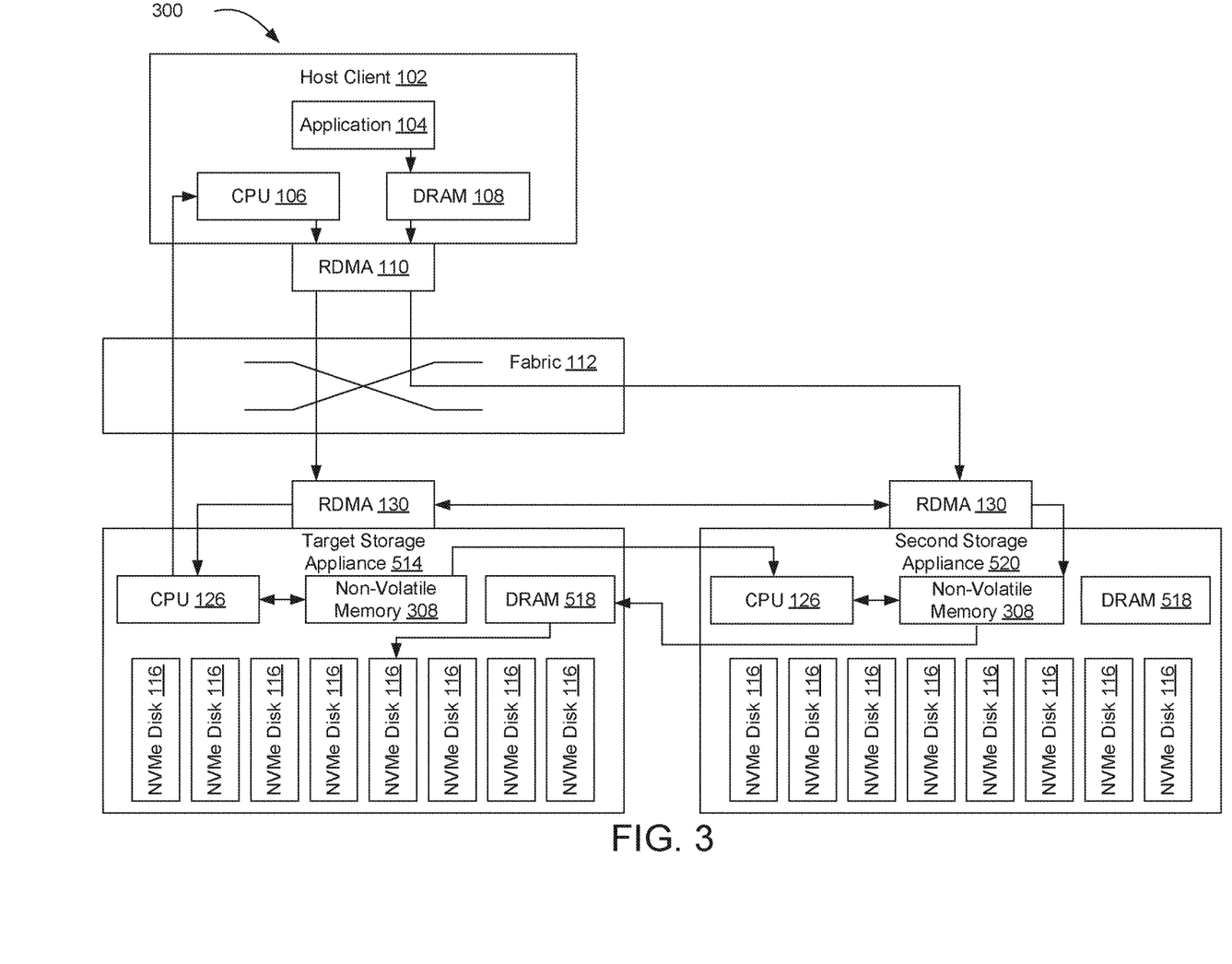
FIG. 3 shows a schematic representation of an NVMe™ storage appliance and a second NVMe™ storage appliance, configured according to one or more embodiments of the present disclosure.

FIG. 3 shows a schematic representation of an NVMe™ system 300 comprising a host client 102, a target storage appliance 514, and a second storage appliances 520 communicating over Fabric 112. The host client 102 is a computing system that comprises an application 104, a CPU 106, and DRAM 108. The target storage appliance 514 and second storage appliance 520 are computing systems that comprises a CPU 126, non-volatile memory 308, DRAM 518, and multiple NVMe™ disks 116. The host client 102, target storage appliance 514, and second storage appliance 520 interface using RDMA 110 and 130 which is a type of network interface controller. DRAM 518 is similar to DRAM 108.

When the host client 102 wants to write data to a particular NVMe™ disk 116 in the target storage appliance 514, CPU 106 of the host client encapsulates the write command and sends the write command to CPU 126 of the target storage appliance 514 using the RDMA interface 110. Application 104 sends the data to DRAM 108 of the host client so that the data is ready for transmission.

Once the target storage appliance 514 receives the write command using the RDMA interface 130, the CPU 126 of the target storage appliance 514 parses the encapsulated write command, de-capsulates it, and extracts the data information. If the non-volatile memory 308 of the target storage appliance 514 does not have free space for the data that the host client 102 wants to transfer, the CPU 126 of the target storage appliance re-directs the write command to a CPU 126 of a second storage appliance 520 using the RDMA interface 110.

When the CPU 126 of the second storage appliance 520 receives the write command re-directed from the CPU 126 of the target storage appliance 514, it determines if it has resources to handle the command. If the second storage appliance 520 does not have the resources to receive the data from the host client 102, the second storage appliance 520 would inform CPU 126 of the target storage appliance 514 so that CPU 126 of the target storage appliance 514 can direct the command to another communicatively coupled storage appliance (not shown) which can receive the data.

If the second storage appliance 520 has the resources to receive the data, CPU 126 of the second storage appliance 520 then initiates a transaction of the data using the RDMA interface 130 from DRAM 108 of the host client 102 to the non-volatile memory 308 of the second storage appliance 520. Following the RDMA 130 transaction, the data will reside in the non-volatile memory 308 of the second storage appliance 520.

Once the data resides in the non-volatile memory 308 of the second storage appliance 520, non-volatile memory 308 sends CPU 126 of the target storage appliance 514 a status that indicates that the data has been stored in non-volatile memory 308 of second storage appliance 520. The CPU 126 of the target storage appliance 514 then encapsulates a status that indicates that the data has been stored in non-volatile memory 308 of the second storage appliance 520 and sends it to the CPU 106 of the host client 102 using the RDMA interface 130. The status serves as an acknowledgement that the data has been stored in non-volatile memory 308 of second storage appliance 520.

In a background process, CPU 126 of the second storage appliance 520 initiates the transfer of the data from the non-volatile memory 308 of the second storage appliance 520 to the DRAM 518 of the target storage appliance 514. Once the data is stored in the DRAM 518 of the target storage appliance 514, CPU 126 of the target storage appliance 514 initiates the transfer of the data from the DRAM 518 of the target storage appliance 514 to the NVMe™ disk 116 of the target storage appliance specified by the write command.

Figure 4:
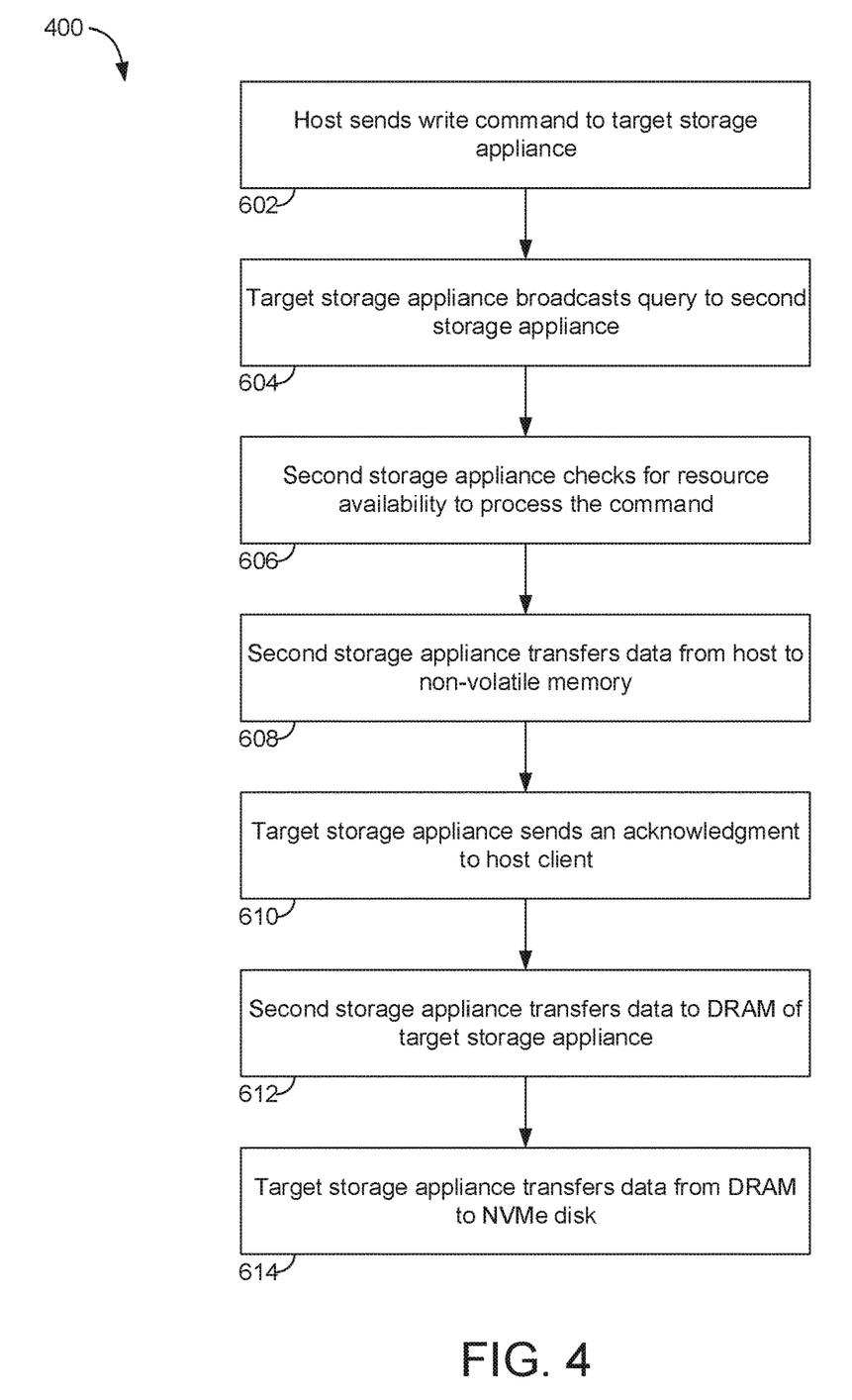
FIG. 4 is a flow diagram of method steps for a write command in NVMe™ over Fabric with a second NVMe™ storage appliance, according to an embodiment of the present disclosure.

A process 400 of a write command using NVMe™ system 300 is illustrated in FIG. 4. The process 400 begins by sending an encapsulated write command from the host client 102 to the target storage appliance 514 in step 602. For example, in NVMe™ system 300, when the host client 102 wants to write data to a particular NVMe™ disk 116 in the target storage appliance 514, CPU 106 of the host client encapsulates the write command and sends the write command to CPU 126 of the target storage appliance 514 using the RDMA interface 110. Application 104 sends the data to DRAM 108 of the host client so that the data is ready for transmission.

Process 400 continues by broadcasting a query with the encapsulated write command from the target storage appliance 514 to the second storage appliance 520 in step 604. For example, in NVMe™ system 300, once the target storage appliance 514 receives the write command using the RDMA interface 130, the CPU 126 of the target storage appliance 514 parses the encapsulated write command, de-capsulates it, and extracts the data information. If the non-volatile memory 308 of the target storage appliance 514 does not have free space for the data that the host client 102 wants to transfer, the CPU 126 of the target storage appliance re-directs the write command to a CPU 126 of a second storage appliance 520 using the RDMA interface 130.

Process 400 continues by determining the resource availability of the second storage appliance 520 in step 606. For example, in NVMe™ system 300, when the CPU 126 of the second storage appliance 520 receives the write command re-directed from the CPU 126 of the target storage appliance 520, it determines if it has resources to handle the command. If the second storage appliance 520 does not have the resources to receive the data from the host client 102, the second storage appliance 520 would inform CPU 126 of the target storage appliance 514 so that CPU 126 of the target storage appliance 514 can direct the command to another communicatively coupled storage appliance (not shown) which can receive the data.

Process 400 continues by transferring data from the DRAM 108 of the host client 102 to the non-volatile memory 308 of the second storage appliance 520 in step 608. For example, in NVMe™ system 300, if the second storage appliance 520 has the resources to receive the data, CPU 126 of the second storage appliance 520 then initiates a transaction of the data using the RDMA interface 130 from DRAM 108 of the host client 102 to the non-volatile memory 308 of the second storage appliance 520. Following the RDMA 130 transaction, the data will reside in the non-volatile memory 308 of the second storage appliance 520.

Process 400 continues by sending an acknowledgement to the host client 102 from the CPU 126 of target storage appliance 514 in step 610. For example, in NVMe™ system 300, once the data resides in the non-volatile memory 308 of the second storage appliance 520, non-volatile memory 308 sends CPU 126 of the target storage appliance 114 a status that indicates that the data has been stored in non-volatile memory 308 of second storage appliance 520. The CPU 126 of the target storage appliance 514 then encapsulates a status that indicates that the data has been stored in non-volatile memory 308 of the second storage appliance 520 and sends it to the CPU 106 of the host client 102 using the RDMA interface 130. The status serves as an acknowledgement that the data has been stored in non-volatile memory 308 of second storage appliance 520.

Process 400 continues by transferring the data from the non-volatile memory 308 of the second storage appliance to the DRAM 518 of the target storage appliance 514 in step 612. For example, in NVMe™ system 300, in a background process, CPU 126 of the second storage appliance 520 initiates the transfer of the data from the non-volatile memory 308 of the second storage appliance 520 to the DRAM 518 of the target storage appliance 514.

Process 400 finishes by transferring the data from the DRAM 518 to one of the target storage appliance 514 to one of the NVMe™ disks 116 of the target storage appliance 514 in step 614. For example, in NVMe™ system 300, Once the data is stored in the DRAM 518 of the target storage appliance 514, CPU 126 of the target storage appliance 514 initiates the transfer of the data from the DRAM 518 of the target storage appliance 514 to the NVMe™ disk 116 of the target storage appliance specified by the write command.

Figure 5:
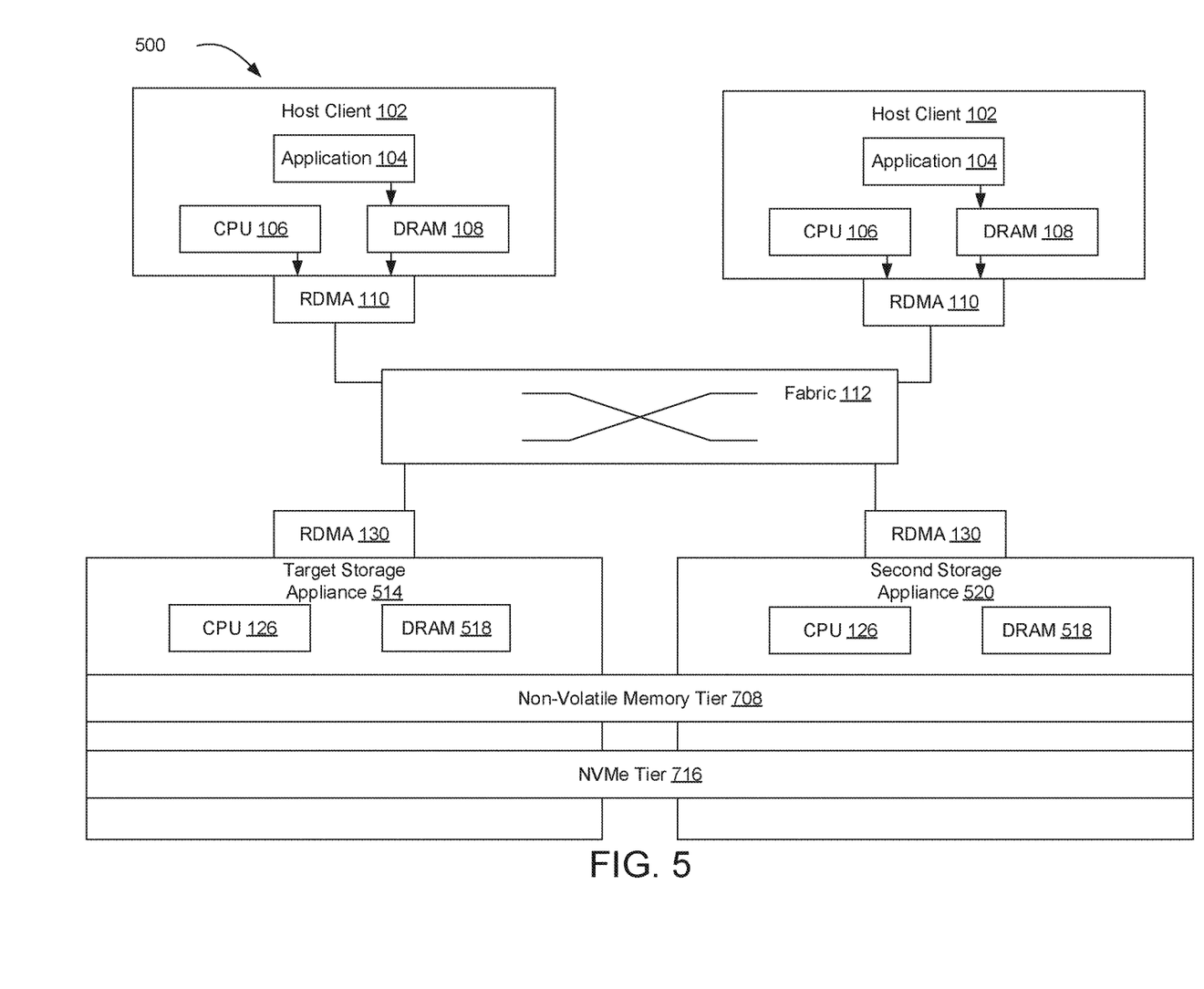
FIG. 5 shows a schematic representation of an NVMe™ storage appliance with a non-volatile memory tier and NVMe™ tier, configured according to one or more embodiments of the present disclosure.

FIG. 5 shows a schematic representation of an NVMe™ system 500 comprising two host clients 102, a target storage appliance 514, and a second storage appliances 520 communicating over Fabric 112. The host clients 102 are computing systems that comprise an application 104, a CPU 106, and DRAM 108. The target storage appliance 514 and second storage appliances 520 are computing systems that comprises a CPU 126, DRAM 518, and multiple NVMe™ disks. The host clients 102, target storage appliance 514, and second storage appliance 520 interface using RDMA 110 and 130 which is a type of network interface controller. NVMe™ system 500 comprises a non-volatile memory tier 708 and NVMe™ tier 716. Non-volatile memory tier 708 is a collection of multiple non-volatile memory devices 308. NVMe™ tier 716 is a collection of multiple NVMe™ disks 116. NVMe™ system 500 may comprise more than two host clients 102 and more than one second storage appliance 520.

NVMe™ system 500 allows for the allocation of NVRAM in a large scale storage deployment, enabling the non-volatile memory tier 708. When a host client 102 wants to write data to a particular NVMe™ disk 116 in a target storage appliance 514, CPU 106 of the host client encapsulates the write command and sends the write command to CPU 126 of the target storage appliance 514 using the RDMA interface 110. The target storage appliance 514 will utilize the non-volatile memory tier 708 to transfer the data from the DRAM 108 of the host client 102 and, further, transfer the data from the non-volatile memory tier 708 to the particular NVMe™ disk of the NVMe™ tier 716.

For example, if the target storage appliance 514 has enough local resources, the target storage appliance 514 will store the data in the local portion of the non-volatile memory tier 708. The target storage appliance 514 will then send an acknowledgment status to the host client 102. If the target storage appliance 514 does not have enough local resources, the target storage appliance 514 will broadcast a query to all of the second storage appliances 520 in the network, asking if there is a second storage appliance 520 that can receive the data. One of the second storage appliances 520 with available resources sends a signal to the target storage appliance 514 indicating that it can receive the data. The process continues as described by process 400.

Figure 6:
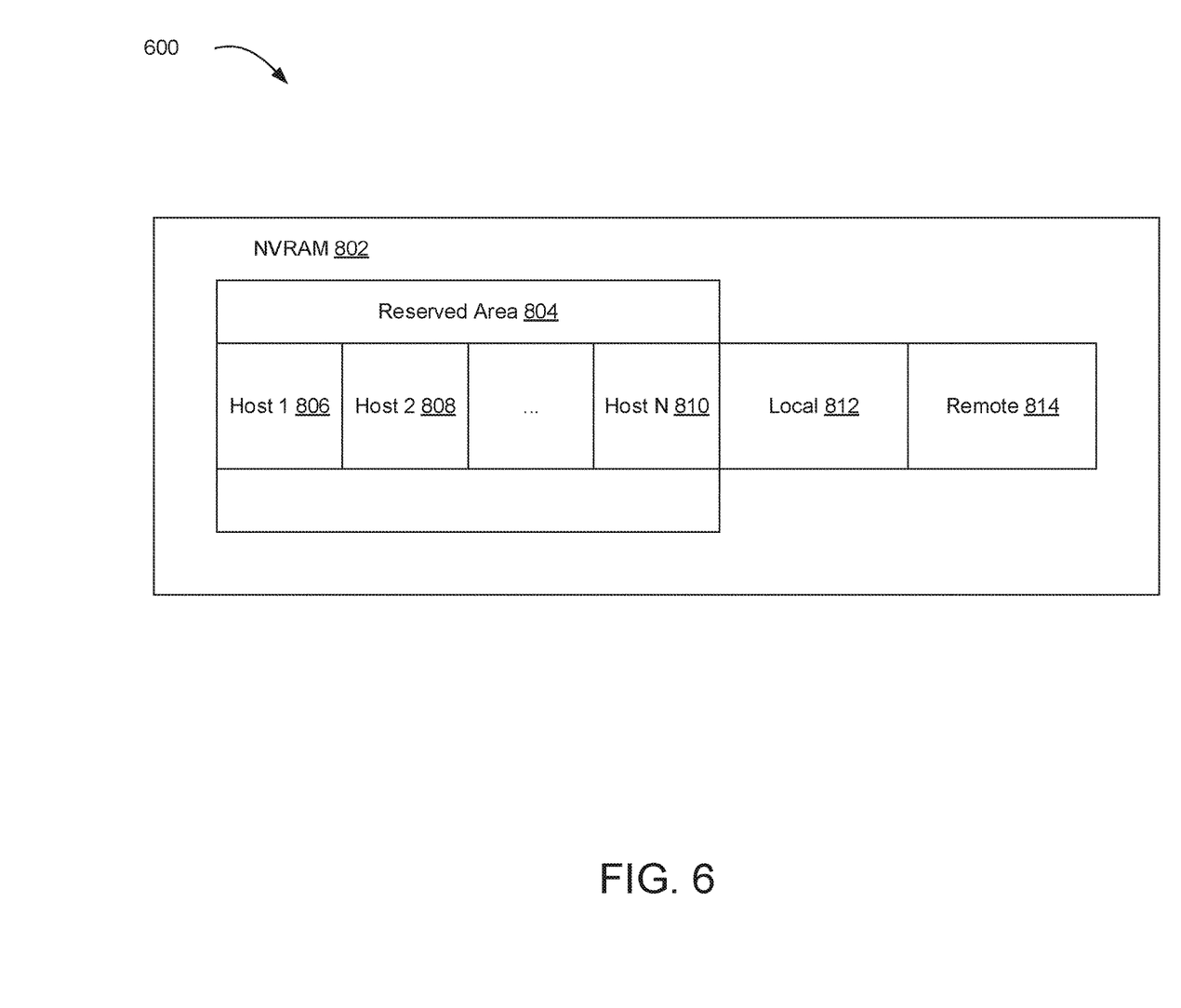
FIG. 6 shows a schematic representation of a non-volatile semiconductor memory device in an NVMe™ storage appliance, configured according to one or more embodiments of the present disclosure.

In order to allocate the valuable and limited resources of the non-volatile memory tier 708, fair and user defined mechanisms should be defined. FIG. 6 shows a schematic representation of an NVRAM device 802. NVRAM 802 is an example of a user defined mechanism for allocating the valuable and limited resources of the non-volatile memory tier 708. NVRAM 802 is a non-volatile semiconductor memory device comprising storage space divided a-priori by an administrator into reserved area 804, local area 812, and remote area 814. NVRAM 802 is an example of a non-volatile memory device 308.

Reserved area 804 defines the guaranteed storage area available for each host client 102. The reserved area 804 is further divided into multiple areas, each area dedicated to a host client 102. Host 1 806 is storage area dedicated to the first host client 102. Host 2 808 is storage area dedicated to the second host client 102. Host N 810 is storage area dedicated to the $N^{th}$ host client 102.

Local area 812 is storage area allocated for data sent to NVRAM 802 for storage in a local NVMe™ disk 116. Local area 812 functions as extra space when the reserved area 804 that corresponds to a particular host client 102 is full. For example, if host 1 storage area 806 corresponding to host client 102 is full and NVRAM 802 receives data from host client 102, the new data may be stored in the local area 812.

Remote area 814 is storage area allocated for data sent to NVRAM 802 for storage in a remote NVMe™ disk 116. Remote area 814 functions as extra space when the reserved area 804 of a target storage appliance 514 is full and a second storage appliance 520 is needed to receive the data. For example, if the NVRAM 802 of a target storage appliance 514 is full, the NVRAM 802 of a second storage appliance 520 can receive the data and store it in the remote storage area 814.

Figure 7:
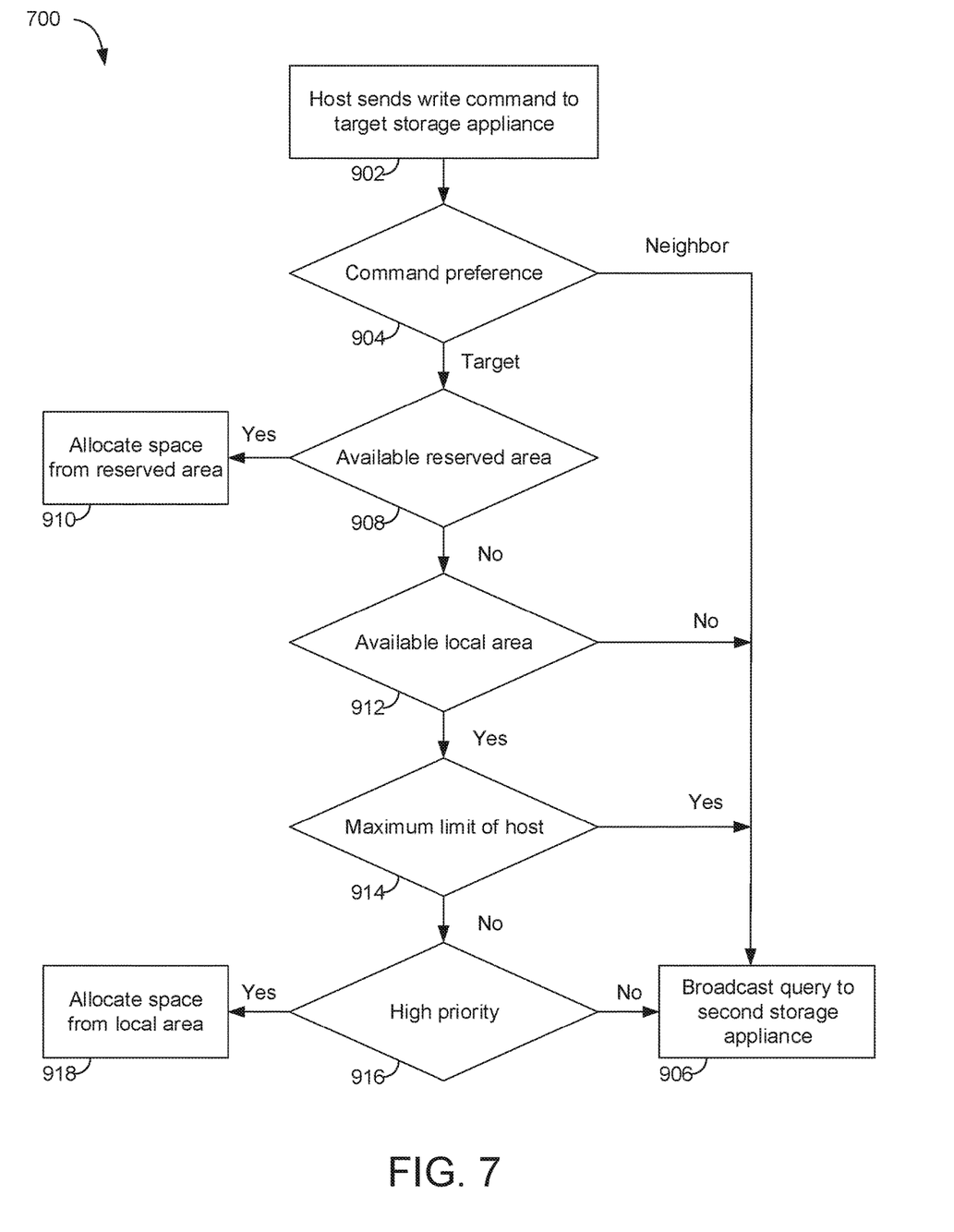
FIG. 7 is a flow diagram of method steps for space allocation during a write command in NVMe™ over Fabric, according to an embodiment of the present disclosure.

A process 700 of allocating space for a write command in an NVRAM device 802 is illustrated in FIG. 7. The process 700 begins by sending an encapsulated write command from the host client 102 to the target storage appliance 514 in step 902. For example, CPU 106 of the host client encapsulates the write command and sends the write command to CPU 106 of the target storage appliance 514 using the RDMA interface 110.

The process 700 continues by determining the command preference of the encapsulated write command in step 904. The encapsulated write command from the host client 102 may have a command preference that specifies if the write command is intended for storage at the target storage appliance 514 or a second storage appliance 520. If the command preference is to send the data to a second storage appliance 520, the process 700 continues to step 906. If the command preference is to send the data to the target storage appliance 514, the process 700 continues to step 908.

At step 906, the target storage appliance 514 broadcasts a query with the write command to a second storage appliance 520. For example, the CPU 106 of the target storage appliance 514 sends the write command to a CPU 106 of a second storage appliance 520 using the RDMA interface 110. The CPU 106 of the target storage appliance 514 may initiate the RDMA interface 110 to broadcast a query to the second storage appliance 520 using the RDMA interface 110. After step 906, process 700 continues as described by process 400, described above.

At step 908, process 700 continues by determining if there is available reserved area 804 dedicated to the host client 102. If there is available reserved area 804 dedicated to the host client 102, process 700 continues to step 910. If there is no available reserved area 804 dedicated to the host client 102, process 700 continues to step 912.

At step 910, process 700 continues by allocating space from the reserved area 804 for data storage. For example, if host 1 storage area 806 corresponding to host client 102 is available, host 1 storage area 806 may be used to store the incoming data from host client 102. After step 910, process 700 continues as described by process 200, described above.

At step 912, process 700 continues by determining if there is available local area 812. If there is no available local area 812, process 700 continues to step 906. If there is available local area 812, process 700 continues to step 914.

At step 914, process 700 continues by determining if the host client 102 has reached a threshold limit of allocation in the local area 812. If the host client 102 has reached a threshold limit of allocation in the local area 812, process 700 continues to step 906. If the host client 102 has not reached a threshold limit of allocation in the local area 812, process 700 continues to step 916.

At step 916, process 700 determines if the priority of the write command is higher than a threshold priority. If the priority of the write command is not higher than the threshold priority, process 700 continues to step 906. If the priority of the write command is higher than the threshold priority, process 700 continues to step 918.

Process 700 finishes by allocating space from the local area 812 for data storage in step 918. For example, if host 1 storage area 806 corresponding to host client 102 is full and NVRAM 802 receives data from host client 102, the new data may be stored in the local area 812.

A similar process occurs when a command is received from a second host client 102. In this situation, the target storage appliance 514 checks remote area 814 for available space. If there is space available in remote area 814, the target storage appliance 514 allocates space from the remote area 814 for the incoming command.

Other objects, advantages and embodiments of the various aspects of the present invention will be apparent to those who are skilled in the field of the invention and are within the scope of the description and the accompanying Figures. For example, but without limitation, structural or functional elements might be rearranged consistent with the present invention. Similarly, principles according to the present invention could be applied to other examples, which, even if not specifically described here in detail, would nevertheless be within the scope of the present invention.

I claim:

1. A network storage appliance comprising:
   a plurality of solid state disks;
   a network interface adapter communicatively coupled to the plurality of solid state disks and a host client, wherein the network interface adapter is configured to:
   retrieve data from the host client, and
   transfer the data from the host client to the plurality of solid state disks;
   a non-volatile semiconductor memory device communicatively coupled to the plurality of solid state disks and the network interface adapter, wherein the non-volatile semiconductor memory device is configured to:
   receive data from the host client via the network interface adapter,
   store the data temporarily, and
   transfer the data to one of the plurality of solid state disks; and
   a CPU communicatively coupled to the non-volatile semiconductor memory device and the network interface adapter, wherein the CPU is configured to:
   receive a write request from the host client via the network interface adapter,
   determine whether or not the non-volatile semiconductor memory device is available to store the data,
   in response to determining that the non-volatile semiconductor memory device is available to store the data, initiate the network interface adapter to perform the transfer of the data from the host client to the non-volatile semiconductor memory device via the network interface adapter, and
   in response to determining that the non-volatile semiconductor memory device is not available to store the data, initiate the network interface adapter to broadcast a query to one or more external storages via the network interface adapter.

2. The network storage appliance of claim 1, wherein the non-volatile semiconductor memory device comprises one of:
   resistive random-access memory,
   magneto resistive random-access memory,
   nano random-access memory, and
   battery-backed dynamic random-access memory.

3. The network storage appliance of claim 1, further comprising:
   a volatile memory device communicatively coupled to the plurality of solid state disks and the network interface adapter, wherein the volatile memory device is configured to receive data from the one or more external storages via the network interface adapter in response to determining that the non-volatile semiconductor memory device is not available to store the data, wherein the one or more external storages correspond to one or more second network storage appliances.

4. The network storage appliance of claim 3, wherein the volatile semiconductor memory device is further configured to transfer the data to one of the plurality of solid state disks.

5. The network storage appliance of claim 1, wherein the CPU is further configured to send an acknowledgement status to the host client via the network interface adapter, wherein the acknowledgement status indicates that the data has been stored in the non-volatile semiconductor memory device or the one or more external storages.

6. The network storage appliance of claim 1, wherein the CPU is further configured to:
   receive a response to the query from a first external storage of the one or more external storages via the network interface adapter, wherein the response to the query indicates that the first external storage is available to store the data; and
   send a second write request to the first external storage via the network interface adapter.

7. The network storage appliance of claim 6, wherein the one or more external storages are one or more of a plurality of second network storage appliances.

8. The network storage appliance of claim 6, wherein the second write request initiates the first external storage to begin the transfer of the data from the host client to the first external storage.

9. The network storage appliance of claim 8, wherein the CPU is further configured to receive a signal from the first external storage via the network interface adapter, wherein the signal indicates that the data has been stored in the first external storage.

10. The network storage appliance of claim 9, wherein the CPU is further configured to send a second acknowledgement status to the host client via the network interface adapter, wherein the second acknowledgment status indicates that the data has been stored in the first external storage.

11. The network storage appliance of claim 1, wherein the network interface adapter functions according to a remote direct memory access (RDMA) protocol.

12. The network storage appliance of claim 1, wherein the network interface adapter is connected to a network communication fabric.

13. The network storage appliance of claim 1, wherein the non-volatile semiconductor memory device comprises a reserved storage area for the host client.

14. The network storage appliance of claim 13, wherein the non-volatile semiconductor memory device further comprises a local storage area and a remote storage area.

15. The network storage appliance of claim 14, wherein the non-volatile semiconductor memory device is further configured to:
   determine whether the reserved storage area is available to store the data; and
   in response to determining that the reserved storage area is available to store the data, allocate space from the reserved storage area in which to store the data.

16. The network storage appliance of claim 15, wherein the non-volatile semiconductor memory device is further configured to:
   in response to determining that the reserved storage area is not available to store the data, determine whether the local storage area is available to store the data; and
   in response to determining that the local storage area is available to store the data, allocate space from the local storage area in which to store the data.

17. The network storage appliance of claim 14, wherein the non-volatile semiconductor memory device is further configured to:
   determine whether the remote storage area is available to store the data; and
   in response to determining that the remote storage area is available to store the data, allocating space from the remote storage area in which to store the data.

18. The network storage appliance of claim 1, wherein the data is transferred from the host client to the non-volatile semiconductor memory device within a time period greater than 0.1 μsec and less than 1 μsec.

19. The network storage appliance of claim 1, wherein the network interface adapter accesses the non-volatile semiconductor memory device independently of the CPU.

20. A method of storing data on a network storage appliance comprising a plurality of solid state disks, a network interface adapter communicatively coupled to the plurality of solid state disks and a host client, a non-volatile semiconductor memory device communicatively coupled to the plurality of solid state disks and the network interface adapter and a CPU communicatively coupled to the non-volatile semiconductor memory device and the network interface adapter, the method comprising:
   retrieving data by the network interface adapter from the host client;
   transferring, by the network interface adapter, the data from the host client to the plurality of solid state disks;
   receiving, by the non-volatile semiconductor memory device, a write request from the host client via the network interface adapter;
   storing, by the non-volatile semiconductor memory device, the data temporarily;
   transferring, by the non-volatile semiconductor memory device, the data to one of the plurality of solid state disks receiving, by the CPU, a write request from the host client via the network interface adapter;
   determining, by the CPU, whether or not the non-volatile semiconductor memory device is available to store the data;
   in response to determining that the non-volatile semiconductor memory device is available to store the data, initiating, by the CPU, the network interface adapter transferring the data from the host client to the non-volatile semiconductor memory device via the network interface adapter; and
   in response to determining that the non-volatile semiconductor memory device is not available to store the data, initiating, by the CPU, the network interface adapter to broadcast a query to one or more external storages via the network interface adapter.

21. The method of claim 20, wherein the non-volatile semiconductor memory device comprises one of:
   resistive random-access memory;
   magneto resistive random-access memory;
   nano random-access memory; and
   battery-backed dynamic random-access memory.

22. The method of claim 20, further comprising:
   receiving, by a volatile memory device communicatively coupled to the plurality of solid state disks and the network interface adapter, the data from the one or more external storages via the network interface adapter in response to determining that the non-volatile semiconductor memory device is not available to store the data, wherein the one or more external storages correspond to one or more second network storage appliances.

23. The method of claim 22, wherein the method further comprises:
   transferring the data from the volatile memory to one of the plurality of solid state disks.

24. The method of claim 20, wherein the method further comprises sending, by the CPU, an acknowledgement status to the host client via the network interface adapter, wherein the acknowledgement status indicates that the data has been stored in the non-volatile semiconductor memory device or the one or more external storages.

25. The method of claim 20, wherein the method further comprises:
   receiving, by the CPU, a response to the query from a first external storage of the one or more external storages via the network interface adapter, wherein the response to the query indicates that the first external storage is available to store the data; and
   sending, by the CPU, a second write request to the first external storage via the network interface adapter.

26. The method of claim 25, wherein the one or more external storages are one or more of a plurality of second network storage appliances.

27. The method of claim 25, wherein the second write request initiates the first external storage to begin the transfer of the data from the host client to the first external storage.

28. The method of claim 27, wherein the method further comprises:
   receiving, by the CPU, a signal from the first external storage via the network interface adapter, wherein the signal indicates that the data has been stored in the first external storage.

29. The method of claim 28, wherein further comprises:
   sending, by the CPU, a second acknowledgement status to the host client via the network interface adapter, wherein the second acknowledgment status indicates that the data has been stored in the first external storage.

30. The method of claim 20, wherein the network interface adapter uses a remote direct memory access (RDMA) protocol.

31. The method of claim 20, wherein the network interface adapter connects to a network communication fabric.

32. The method of claim 20, wherein the non-volatile semiconductor memory device reserves storage area for the host client.

33. The method of claim 32, wherein the non-volatile semiconductor memory device reserves a local storage area and a remote storage area.

34. The method of claim 33, the method further comprises:
  determining, by the non-volatile semiconductor memory device, whether the reserved storage area is available to store the data; and
  in response to determining that the reserved storage area is available to store the data, allocating, by the non-volatile semiconductor memory device, space from the reserved storage area in which to store the data.

35. The method of claim 34, wherein the method further comprises:
  in response to determining that the reserved storage area is not available to store the data, determining, by the non-volatile semiconductor memory device, whether the local storage area is available to store the data; and
  in response to determining that the local storage area is available to store the data, allocating, by the non-volatile semiconductor memory device, space from the local storage area in which to store the data.

36. The method of claim 33, wherein the method further comprises:
  determining, by the non-volatile semiconductor memory device, whether the remote storage area is available to store the data; and
  in response to determining that the remote storage area is available to store the data, allocating, by the non-volatile semiconductor memory device, space from the remote storage area in which to store the data.

37. The method of claim 20, wherein the data is transferred from the host client to the non-volatile semiconductor memory device of the target network storage appliance within a time period greater than 0.1 μsec and less than 1 μsec.

38. The method of claim 20, wherein the network interface adapter accesses the non-volatile semiconductor memory device independently of the CPU.

* * * * *